United States Patent [19]
Cheng et al.

[11] Patent Number: 5,957,718
[45] Date of Patent: Sep. 28, 1999

[54] DEVICE FOR RECEIVING A MEMORY CARD

[75] Inventors: Yin-Shiang Cheng, Taipei; Hsueh-Wen Sun; Long-Jyh Pan, both of Taipei Hsien, all of Taiwan

[73] Assignee: Acer Peripherals Inc., Taiwan

[21] Appl. No.: 09/007,721

[22] Filed: Jan. 15, 1998

[30] Foreign Application Priority Data

Jun. 28, 1997 [TW] Taiwan .................................. 86210725

[51] Int. Cl.⁶ .................................................... H01R 4/50
[52] U.S. Cl. ............................................. 439/347; 379/429
[58] Field of Search ..................................... 439/347, 358, 439/923, 152, 946, 157, 159; 379/357, 429; 364/708.1; 361/684; 235/479; 455/90

[56] References Cited

U.S. PATENT DOCUMENTS

| | | | |
|---|---|---|---|
| 3,823,367 | 7/1974 | Kaye et al. | 324/29.5 |
| 3,917,372 | 11/1975 | Selinko | 439/349 |
| 4,146,682 | 3/1979 | Nakao | 429/97 |
| 4,236,667 | 12/1980 | Crowley et al. | 235/479 |
| 5,220,520 | 6/1993 | Kessoku | 364/708.1 |
| 5,257,414 | 10/1993 | Trahan et al. | 455/90 |
| 5,319,519 | 6/1994 | Sheppard et al. | 361/685 |
| 5,436,969 | 7/1995 | Kobayashi | 379/433 |
| 5,615,250 | 3/1997 | Kobayashi | 379/61 |
| 5,812,370 | 9/1998 | Moore et al. | 439/159 |
| 5,815,570 | 9/1998 | Hannon et al. | 379/429 |

*Primary Examiner*—Paula Bradley
*Assistant Examiner*—Tho D. Ta
*Attorney, Agent, or Firm*—Pillsbury Madison & Sutro LLP

[57] ABSTRACT

A device for receiving a memory card of a portable telephone set. The memory card-receiving device includes a memory card chamber for receiving the memory card. The memory card chamber can be freely inserted into or ejected from an open slot formed in the end surface of the portable telephone set. When the memory card chamber is fully inserted into the open slot, it is engaged with the portable telephone set by an engaging mechanism. The memory card chamber is ejected from the open slot by a curved spring strip disposed at the bottom of the open slot when the engaging mechanism is released.

9 Claims, 7 Drawing Sheets

DEVICE FOR RECEIVING A MEMORY CARD

BACKGROUND OF THE INVENTION

1. Field of the Invention

The present invention relates to a device for receiving a memory card. In particular, it relates to a device for receiving a SIM (Subscriber Identification Module) chip card of a portable telephone set, which can be freely inserted into or slid out of an open slot formed in the telephone set without detaching the battery unit or using a tool.

2. Description of the Prior Art

U.S. Pat. No. 5,257,414 issued to Trahan et al discloses a SIM chip card reader used in a portable telephone set. The SIM chip card reader is integrated into the telephone set, and thus when the SIM chip card is to be inserted into the reader, the battery pack must be removed from the backside of the telephone set.

U.S. Pat. No. 5,436,969 issued to Kobayashi discloses a portable telephone set for use in combination with an IC card. The telephone set includes a telephone body having a battery unit-receiving portion and a battery unit. The IC card is attached to the battery unit-receiving portion and is sandwiched between the battery unit-receiving portion and the battery unit. According to this design, when different users use the telephone set, the battery unit must be detached in order to insert a new IC card.

U.S. Pat. No. 5,615,250 issued to Kobayashi discloses a portable telephone set which includes a main section and a battery pack. The battery pack is removably connected to the main section and has a L-shaped rib to provide a slot in which the IC card is inserted. This design also requires that the battery pack be detached when an IC card is to be inserted into the slot.

SUMMARY OF THE INVENTION

In view of the above disadvantage of the prior art, an object of the invention is to provide a device for receiving a memory card of a portable telephone set which can be freely inserted into or slid out of an open slot formed in the telephone set without detaching the battery unit or using a tool.

The above object is attained by providing a memory card-receiving device which includes a memory card chamber being freely inserted into or slid out of the open slot, an engaging means to engage the memory card chamber when it is inserted into the open slot, and an ejecting means for ejecting the memory card chamber when the engaging means is released.

BRIEF DESCRIPTION OF THE DRAWINGS

The present invention can be more fully understood by reference to the following detailed description and the preferred embodiments with reference made to the accompanying drawings, in which.

DETAILED DESCRIPTION OF THE PREFERRED EMBODIMENTS

First Embodiment

Figure 1:
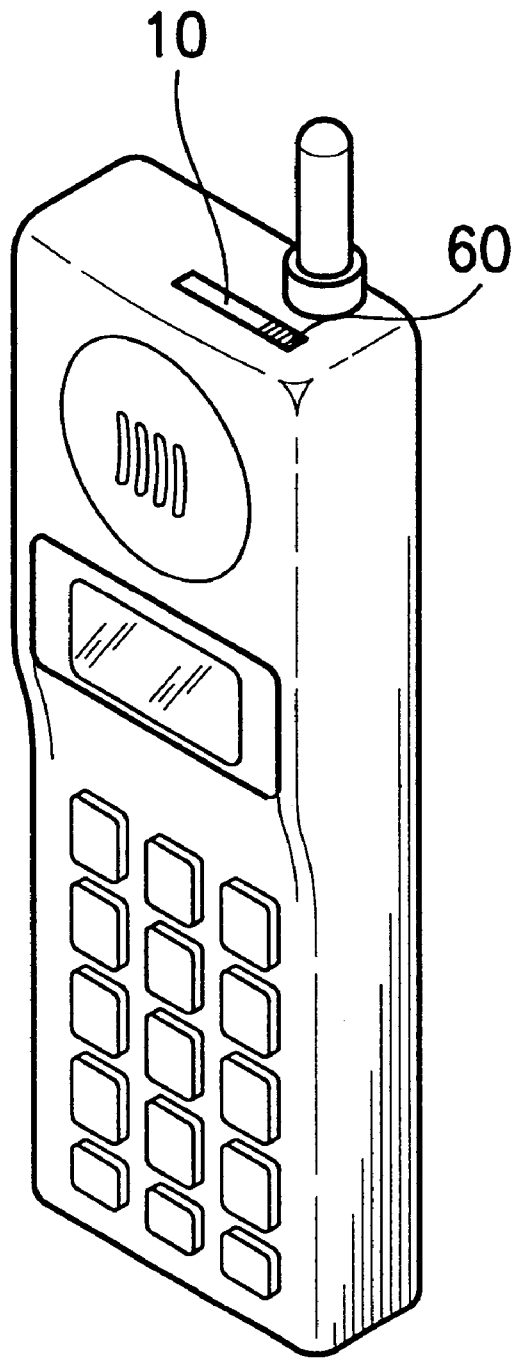
FIG. 1 is a perspective view of the portable telephone set in which an open slot is formed in the end surface thereof according to a preferred embodiment of the invention.

FIG. 1 depicts a portable telephone set 1. The portable telephone set 1 has an open slot 60 formed at the end surface thereof for inserting therein a memory card chamber 10 of the invention.

Figure 2:
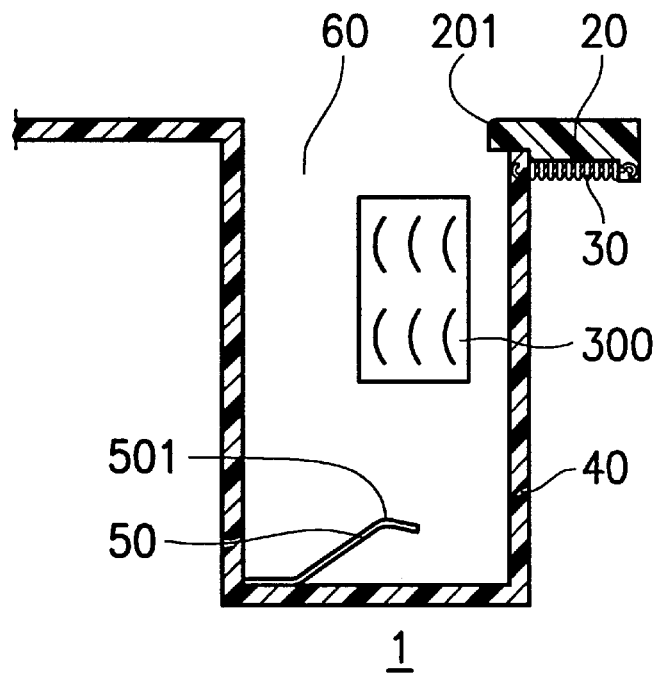
FIG. 2 is a vertical sectional view schematically showing a state in which a memory card chamber is removed from the open slot.

Referring to FIG. 2, the open slot 60 is formed in the housing 40 of the portable telephone set 1. A curved spring strip 50 having a curved portion 501 is disposed at the bottom of the open slot 60. A sliding member 20 is disposed at the end surface of the portable telephone set 1 and is biased by a coil spring 30 disposed thereunder so that the sliding member 20 can slide along the end surface when it is pushed away from the open slot 60. The sliding member 20 has a protrusion block 201. Numeral 300 denotes the electrical contacts for connecting with the electrical contacts disposed on a memory card when the memory card is loaded in the memory card chamber and the memory card chamber is fully inserted in the open slot 60.

Figure 3:
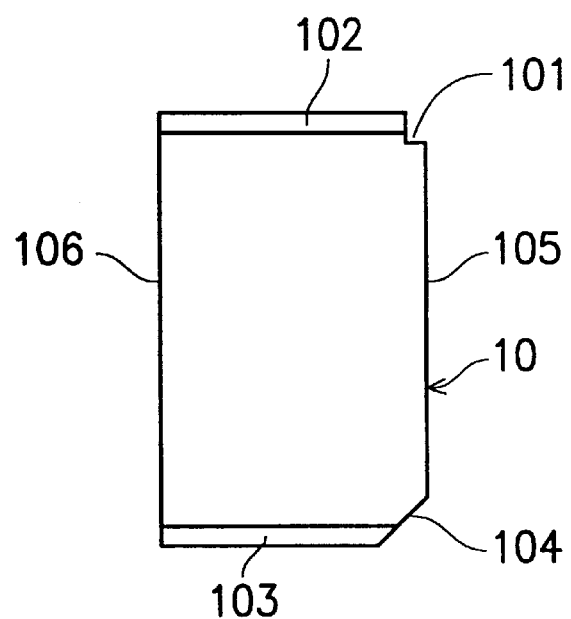
FIG. 3 is a schematic view showing the memory card chamber separated from the portable telephone set.

Referring to FIG. 3, the memory card chamber 10 is substantially in a rectangular shape formed by a top end surface 102, a bottom end surface 103, a first side surface 105 and a second side surface 106. The memory card chamber 10 includes a cut out portion 101 formed at the corner of the top end surface 102 and the first side surface 105 and a inclined surface 104 formed at the corner of the bottom end surface 103 and the first side surface 105. The function of the inclined surface 104 is to urge the sliding member 20 to slide rightward when the memory card chamber 10 is inserted into the open slot 60. Note that the top end surface 102 and the bottom end surface 103 are folded up to form a laterally protruded edge for receiving and retaining a memory card (not shown) therein.

Figure 4A:
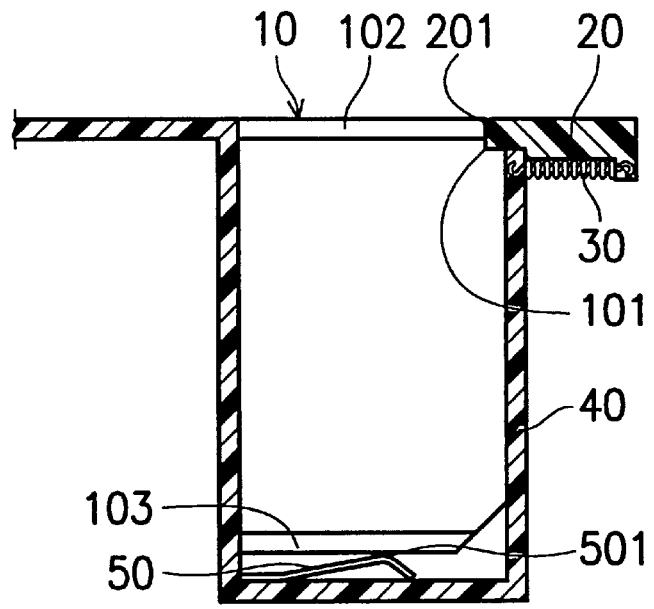
FIG. 4A, is a vertical sectional view showing the memory card chamber of FIG. 3 fully inserted into the open slot.

Referring to FIG. 4A, when the memory card chamber 10 is inserted into the open slot 60, the cut out portion 101 of the memory card chamber 10 is engaged by the protrusion block 201 of the sliding member 20, and the curved portion 501 of the curved spring strip 50 comes in contact with the bottom surface 103 of the memory card chamber 10 and is compressed.

Figure 4B:
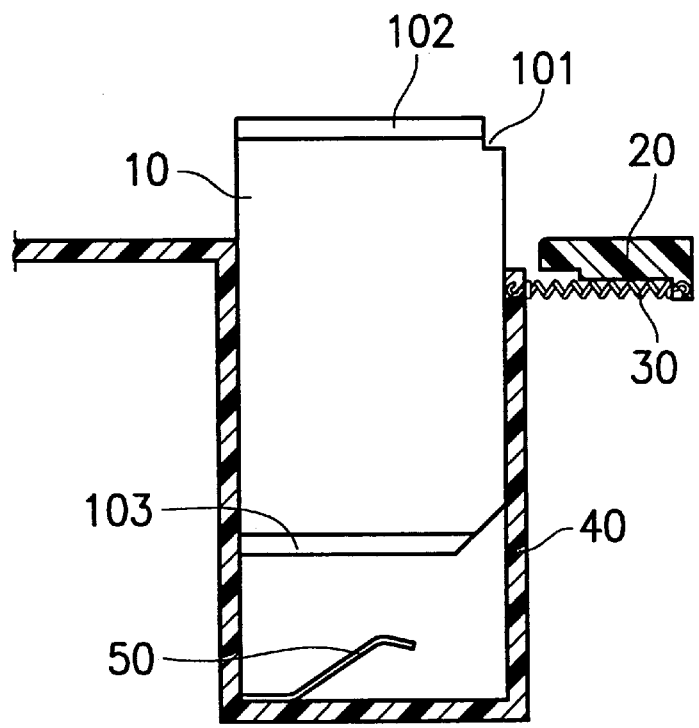
FIG. 4B is a vertical sectional view showing the memory card chamber of FIG. 3 partially ejected out of the open slot by an ejector.

Referring to FIG. 4B, when the sliding member 20 is pressed to move rightward, the memory card chamber 10 becomes released from the sliding member 20, and is ejected by the curved spring strip 50.

Figure 4C:
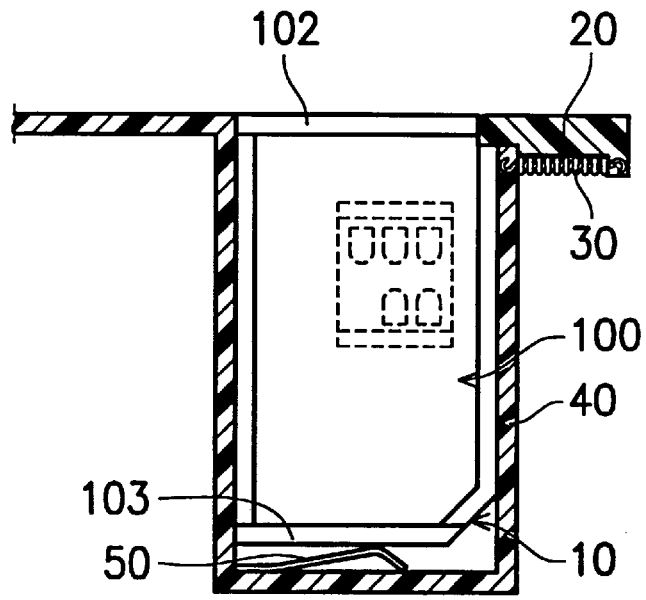
FIG. 4C is a vertical sectional view showing the memory card chamber fully inserted in the open slot in which a memory chip card is loaded in the memory card chamber.
Figure 4D:
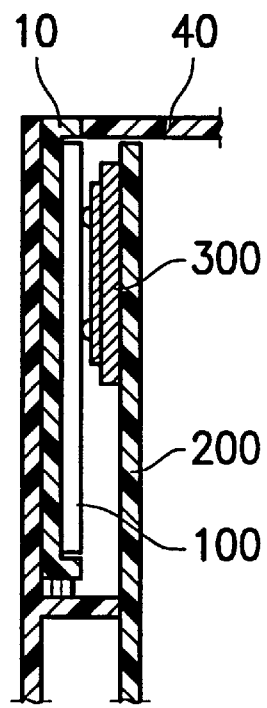
FIG. 4D is a side sectional view of FIG. 4c.

FIG. 4C shows that the memory card chamber 10 is fully inserted in the open slot 60 in which a memory chip card 100 is loaded in the memory card chamber 10. FIG. 4D is a side sectional view of FIG. 4c.

Second Embodiment

Figure 5A:
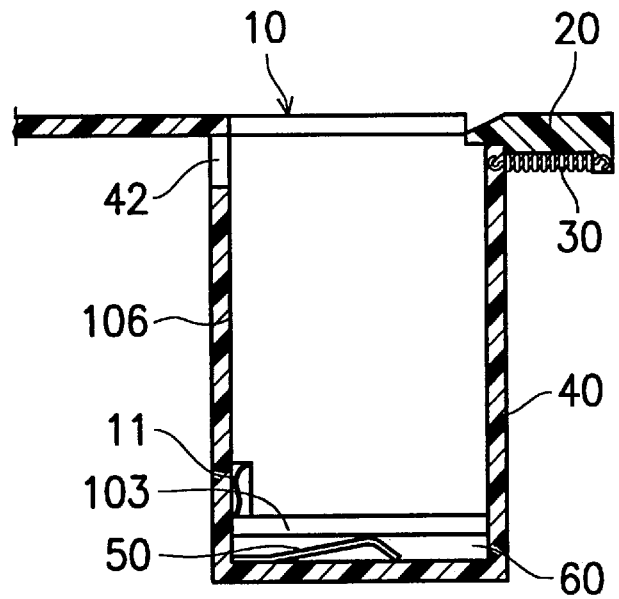
FIG. 5A is a vertical sectional view showing a memory card chamber fully inserted into the open slot according to a second preferred embodiment of the invention.
Figure 5B:
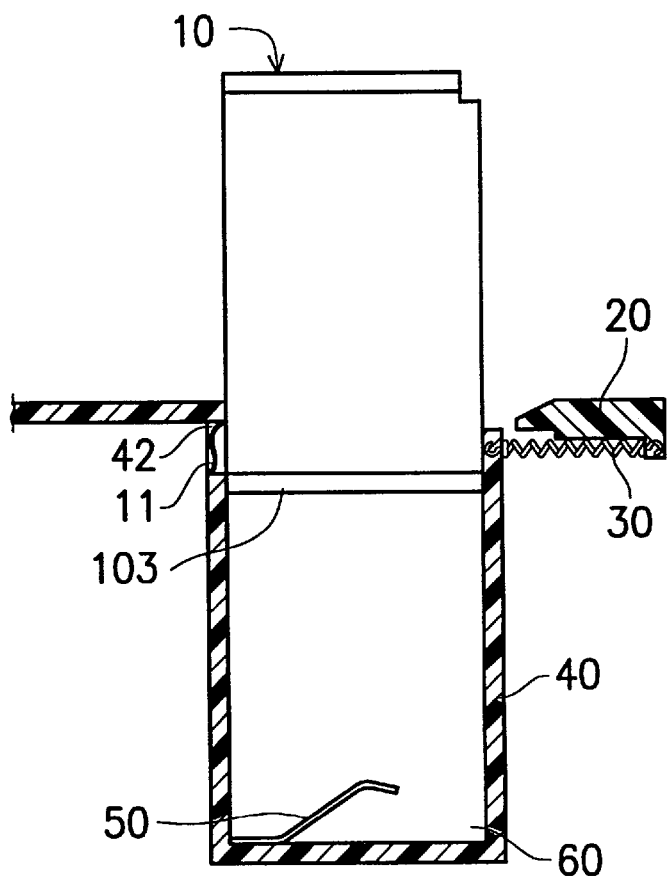
FIG. 5B is a vertical sectional view showing the memory card chamber almost fully ejected from the open slot and retained by an elastic member which is disposed on the memory card chamber and is received in a groove formed at the top of the open slot.

Referring to FIG. 5A, the memory card chamber 10 fully inserted into the open slot 60 is provided with an elastic member 11. The elastic member 11 is also a curved spring strip and is disposed at the second side surface 106 in proximity to the bottom surface 103. The elastic member 11 is compressed by the inner side wall of the open slot 60 when the memory card chamber 10 is inserted therein, and is expanded and engaged in a groove 42 formed at the top of the inner side wall of the open slot 60 when the memory card chamber 10 is almost slid out of the open slot 10, as shown in FIG. 5B. This design prevents the memory card chamber 10 from being lost.

Third Embodiment

Figure 6A:
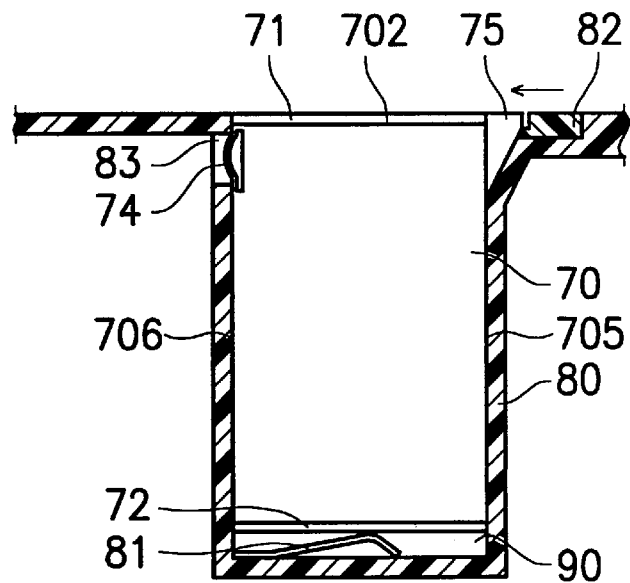
FIG. 6A is a vertical sectional view showing a memory card chamber fully inserted in the open slot according to a third preferred embodiment of the invention.
Figure 6B:
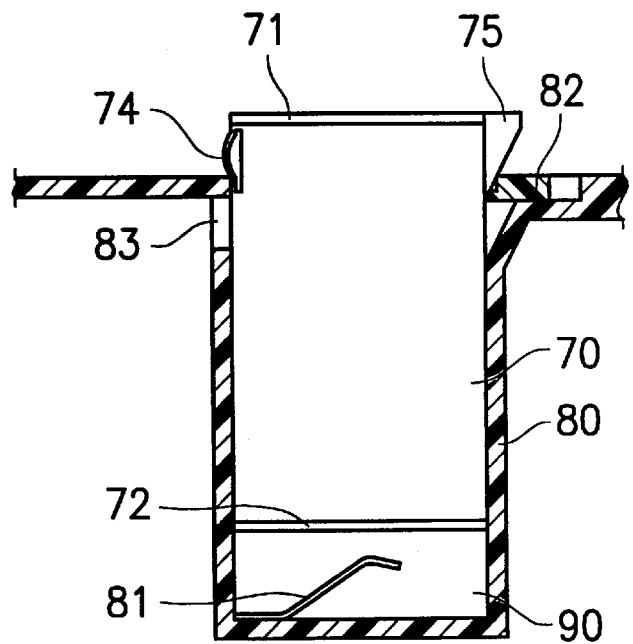
FIG. 6B is a vertical sectional view showing the function of the wedge portion disposed at the memory card chamber of FIG. 6A.

Referring to FIG. 6A, a third embodiment of the present invention is shown. In this embodiment, a wedge portion 75 is formed at the first side surface 705 of the memory card chamber 70 and an elastic member 74 is disposed on the second side surface 706 of a housing 80 in proximity to the top surface 702 of a top end surface 71. When the memory card chamber 70 is fully inserted into the open slot 90, the elastic member 74 is engaged in the groove 83 formed in the top of the inner wall of the open slot 90, and the wedge portion 75 is urged by the sliding member 82 and the curved spring strip 81 is compressed by the folded up edge 72. And when the memory card chamber 70 is to be removed, by pressing the sliding member 82 in the direction indicated by the arrow, the wedge portion 75 is urged and the elastic member 74 becomes disengaged, and accordingly the memory card chamber 70 is moved out of the open slot 90. FIG. 6B shows the memory card chamber 70 partially ejected from the open slot 90.

Fourth Embodiment

Figure 7A:
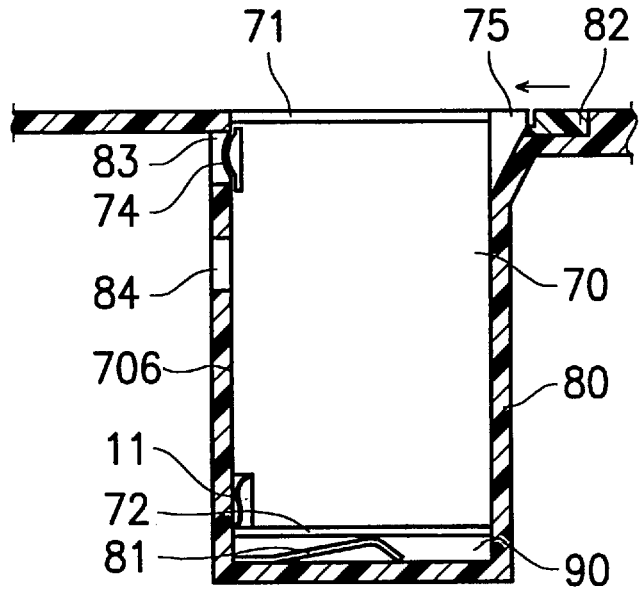
FIG. 7A is a vertical sectional view showing a memory card chamber fully inserted in the open slot according to a fourth preferred embodiment of the invention.
Figure 7B:
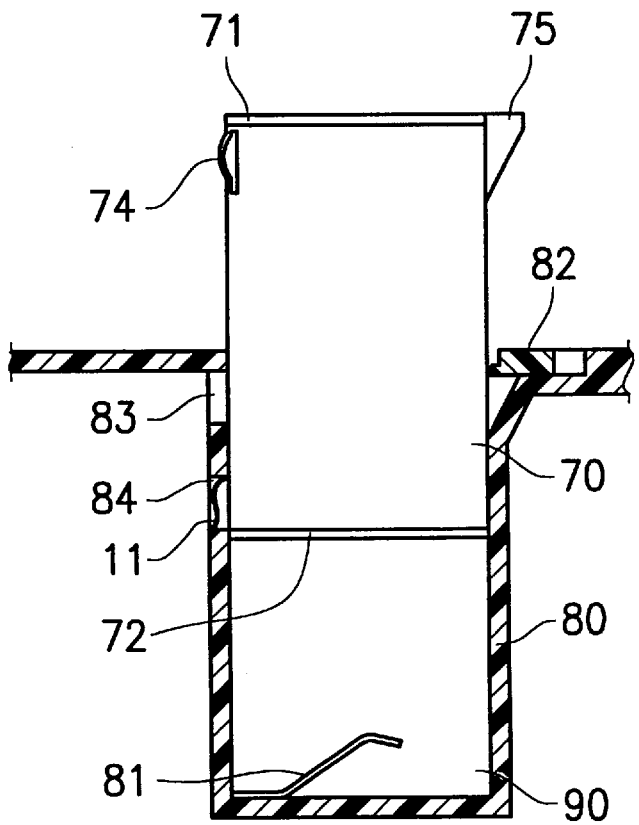
FIG. 7B is a vertical sectional view showing the state he memory card chamber of FIG. 7A is partially ejected from the open slot and is retained by an elastic member which is disposed on the memory card chamber and is received in a groove formed at the side wall of the open slot.

Referring to FIG. 7A, a fourth embodiment of the invention is shown. In this embodiment, two elastic members 11 and 74 are respectively disposed at the bottom and the top of the memory card chamber 70 along its second side surface 706. Two grooves 83 and 84 for receiving respectively the elastic member 74 and 11 are formed on the inner wall of the open slot 90 so that when the memory card chamber 70 is ejected by pressing the wedge portion 75, the elastic member 11 is engaged by the groove 84, thus preventing the memory card chamber 70 from being detached. FIG. 7B shows the memory card chamber 70 retained in the open slot 90 by the engagement of the elastic member 11 with the groove 84.

What is claimed is:

1. A memory card-receiving device having an open slot formed in an end surface of an electronic device, the memory card-receiving device comprising:

a memory card chamber for receiving a memory card, capable of being freely inserted into or slid out of the open slot;

an engaging means for maintaining engagement of said memory card chamber onto the electronic device when said memory card chamber is fully inserted into the open slot; and an ejecting means for ejecting said memory card chamber from the open slot when said engaging means is released.

2. The memory card-receiving device as claimed in claim 1, wherein said memory card chamber is rectangular in shape and is formed by a top end surface, a bottom end surface, a first side surface and a second side surface, and includes a cut out portion formed at corner of the top end surface and the first side surface; and said engaging means is disposed at a top of the open slot in proximity to the cut out portion of said memory card chamber when said memory card chamber is fully engaged in the open slot and includes an engaging member for engaging with said cut out portion and a biasing means, said biasing means is biased when the engaging member is engaged with the cut out portion of the memory card chamber.

3. The memory card-receiving device as claimed in claim 2, wherein said ejecting means is a curved spring strip including a curved portion, disposed at the bottom of the open slot in such a manner when said memory card chamber is inserted into the open slot and engaged by said engaging member, the curved portion of said ejecting means comes in contact with said memory card chamber.

4. The memory card-receiving device as claimed in claim 2, wherein said biasing means is a coil spring.

5. The memory card-receiving device as claimed in claim 2, wherein said engaging member is a sliding member capable of sliding along the end surface of the electronic device and having a protrusion block so that when said sliding member is pressed toward said memory card chamber, the protrusion block becomes engaged with the cut out portion.

6. The memory card-receiving device as claimed in claim 5, wherein said memory card chamber includes an inclined surface formed at the corner of the bottom end surface and the first side surface so that when said card chamber is inserted into the open slot, the inclined surface urges said sliding member to slide back.

7. The memory card-receiving device as claimed in claim 5, wherein said memory card chamber includes a wedge portion formed at the corner of the top end surface and the first side surface thereof.

8. The memory card-receiving device as claimed in claim 2, wherein said memory card chamber includes a first elastic member disposed at the second side surface in proximity to the bottom end surface, and in an inner side wall of the open slot a first groove is formed for receiving said first elastic member.

9. The memory card-receiving device as claimed in claim 8, wherein said memory card chamber further includes a second elastic member disposed at the second side surface in proximity to the top end surface, and a second groove for receiving the second elastic member is formed above the first groove.

* * * * *